(12) United States Patent
Geiger

(10) Patent No.: US 6,434,536 B1
(45) Date of Patent: Aug. 13, 2002

(54) METHODS AND SYSTEMS FOR COMMERCE

(76) Inventor: Timothy S. Geiger, 850 Collegeville Rd., Colllegeville, PA (US) 19426

( * ) Notice: Subject to any disclaimer, the term of this patent is extended or adjusted under 35 U.S.C. 154(b) by 0 days.

(21) Appl. No.: 09/219,662

(22) Filed: Dec. 23, 1998

(51) Int. Cl.[7] .............................................. G06F 17/60
(52) U.S. Cl. ........................... 705/37; 705/26; 705/27; 705/40; 705/53; 705/77
(58) Field of Search ........................... 705/37, 6, 5, 26, 705/27, 40, 53, 77; 348/10, 13; 345/327; 713/1; 463/25; 709/233

(56) References Cited

U.S. PATENT DOCUMENTS

| | | | |
|---|---|---|---|
| 5,297,031 A | * 3/1994 | Gutterman et al. | 364/408 |
| 5,584,025 A | * 12/1996 | Keithley et al. | 395/615 |
| 5,644,721 A | * 7/1997 | Chung et al. | 395/206 |
| 5,710,887 A | * 1/1998 | Chelliah et al. | 395/226 |
| 5,737,414 A | * 4/1998 | Walker et al. | 380/4 |
| 5,749,785 A | * 5/1998 | Rossides | 463/25 |
| 5,845,265 A | * 12/1998 | Woolston | 705/37 |
| 5,905,974 A | * 5/1999 | Fraser et al. | 705/37 |
| 6,005,926 A | * 12/1999 | Mashinsky | 379/114 |
| 6,014,643 A | * 1/2000 | Minton | 705/37 |
| 6,014,644 A | * 6/2000 | Erickson | 705/37 |

FOREIGN PATENT DOCUMENTS

EP          0801 481 A  * 10/1997  .......... H04L/12/46

OTHER PUBLICATIONS

Andreoli, J; Pacull, F; Pareschi, R; XPECT; a framework for electronic commerce, IEEE Internet Computing, v1,; n4; pp. 40–48, Jul. 1997.*
Solomon, Stephen D; Staking a claim on the internet; Inc. Technology; v16, n13;p87, 1994.*
Snape, Becky; Connection offers sercure database single sign–on enterprise client/server applications, PR Newswire; p1061LA041, Nov. 6, 1995.*
Norr, Henry; Workgroup routers all the rage; MacWeek; v9; n14; p16, Jul. 1997.*
Nelson, Matthew; UUNet provides multicasting for Internet Service Provider; InfoWord; v19; n40, p90, Oct. 6, 1997.*
Norr, Hemry; Workgroup routes all the rage; MacWeek; v9; n14, p16, Oct. 6, 1997.*

* cited by examiner

Primary Examiner—Vincent Millin
Assistant Examiner—Pedro Kanof
(74) Attorney, Agent, or Firm—Joseph E. Chovanes

(57) ABSTRACT

Methods and systems are offered to create, eliminate and/or modify trade channels. These can utilize a variety of communication media, including computer networks and the network of interconnected machines known as the Internet.

18 Claims, 10 Drawing Sheets

Quick Shipping Screen

| | |
|---|---|
| FROM: | Philadelphia, PA |
| TO: | VARIOUS LOCATIONS NATIONWIDE |
| QUANTITY: | UNKNOWN |
| SIZE: | 5"x 10" UNITS |
| WEIGHT: | 8 oz |
| PRICES: | |
| OVERNIGHT | $8.95 |
| TWO DAY | $2.95 |
| THREE DAY | $0.95 |

*Figure 8*

Quick Shipping Screen

| | |
|---|---|
| FROM: | Lexington, KY |
| TO: | VARIOUS LOCATIONS NATIONWIDE |
| QUANTITY: | UNKNOWN |
| SIZE: | 5"x 10" UNITS |
| WEIGHT: | 8 oz |
| PRICES: | |
| OVERNIGHT | $8.95 |
| TWO DAY | $2.95 |
| THREE DAY | $0.95 |

*Figure 8a*

METHODS AND SYSTEMS FOR COMMERCE

BACKGROUND OF THE INVENTION

The classic model of buyer-seller interaction is predicated on supply and demand. Greater supply leads to lower prices. Additionally, the market has always favored efficiency of delivery—the seller with lower costs is able to pass them along to the buyer and gain an advantage.

However, heretofore the ability to pass along the seller's lower costs to the buyer has taken time to develop—the nature of standard commerce does not permit instantaneous or nearly instantaneous transmission of price data or other information that may provide the seller with an advantage over others.

What has been lacking is a mechanism for allowing sellers to benefit from their efficiencies, while at the same time allowing buyers the ability to benefit from those efficiencies instantaneously or nearly instantaneously.

Accordingly, it is an object of the present invention to provide systems and methods for buyers and sellers to instantaneously or nearly instantaneously create a commerce channel or channels.

It is a further object of the present invention to provide systems and methods for permitting buyers and sellers to make use of the realized efficiencies of the market.

SUMMARY OF THE INVENTION

The present invention provides methods and systems for facilitating commerce by allowing for instantaneous or nearly instantaneous changes of price and other information, so that interested parties in commerce, for example, buyers and sellers, may benefit from the creating, eliminating and modifying of instantaneous or nearly instantaneous commerce channels. Preferred embodiments use computer networks and the network of connected machines known as the Internet in creating, eliminating and modifying, instantaneous or nearly instantaneous commerce channels.

BRIEF DESCRIPTION OF THE DRAWINGS

FIG. 8 also shows the embodiment of FIG. 1.

FIG. 8a also shows the embodiment of FIG. 1.

DETAILED DESCRIPTION OF THE INVENTION

Figure 1:
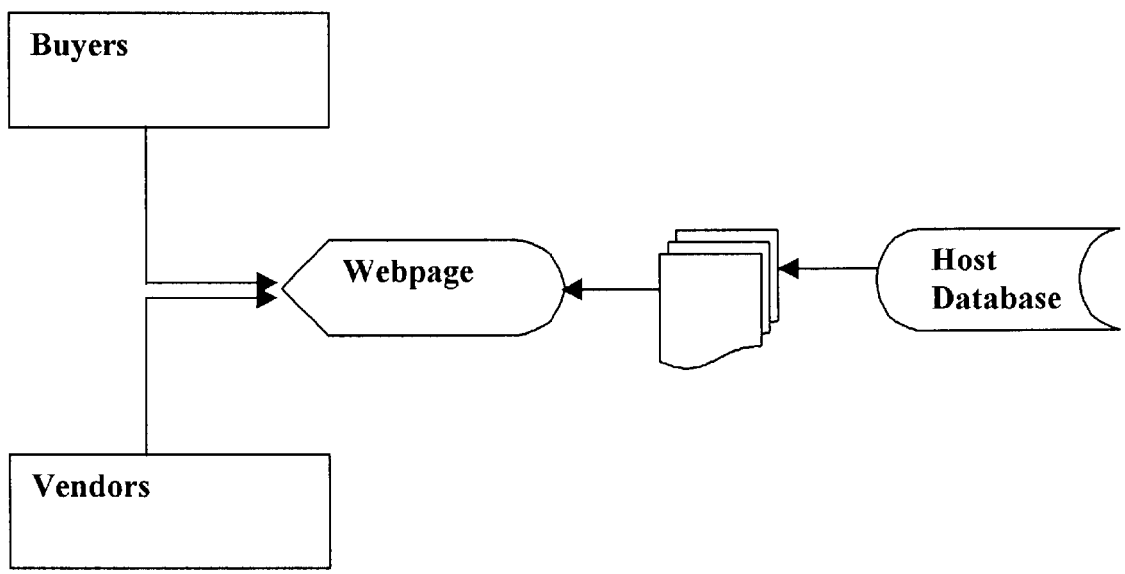
FIG. 1 shows an embodiment of the present invention.

FIG. 1 shows a schematic diagram of a preferred embodiment of the present invention. This embodiment utilizes the interconnected network of computers known as the Internet. More specifically, this embodiment uses the World Wide Web. In other embodiments, any type of communication media can be used, as long as it allows for the instantaneous or nearly instantaneous—substantially contemporaneous—transfer of information. For example, the much anticipated "convergence" of broadcast, communications and digital media could function as communication media for the system, or in other embodiments, shopping channels, whether broadcast or on WebTV, interactive TV and/or cable, and the like could be the communication media.

In FIG. 1, the host database, that is the seller's, is stored on a machine that contains a Website in a manner known in the art. That Website possesses numerous pages owned by the seller (also known below as the Webpage owner), of which one is shown in FIG. 1 being accessed by potential buyers and vendors. It should be noted that in this embodiment the database is singular, however, multiple databases may be used. For example, one embodiment that may be used and is known in the art would be a front end server functioning as a catalog server and a back end server functioning as a transaction server. The front end server would run Microsoft Site Server Commerce Edition and the back end server would run Microsoft SQL Server. The buyer visiting the site would interface with the Web server, which would query the SQL server as needed to assemble the catalog and process orders.

Figure 2:
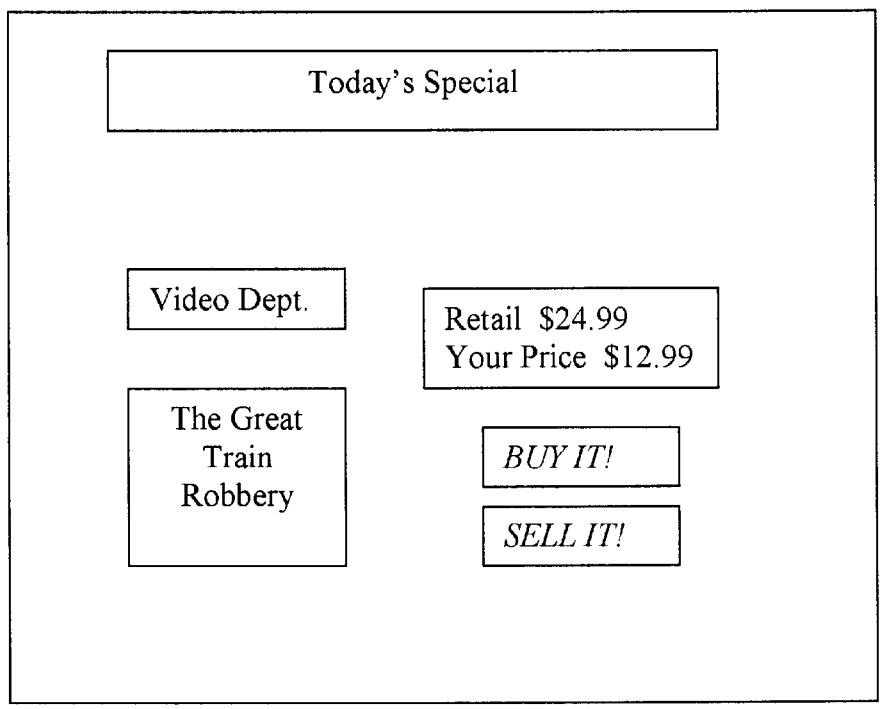
FIG. 2 shows the embodiment of FIG. 1.

FIG. 2 shows a sample Webpage of the embodiment of FIG. 1. In this embodiment, the Webpage permits open access, that is, there are no passwords or other methods of restricting access to the site. The two entities of FIG. 1 would primarily be using the Website in this embodiment: 1) buyers; and, 2) vendors or suppliers.

The buyer would view the item or items offered by the site. FIG. 2 shows a video, The Great Train Robbery, offered for sale on a Webpage of the site. The suggested retail price is listed, as well as the discount price offered to the buyer. If the buyer wishes to purchase, he or she will click on the BUY IT button. He or she will then be taken through a Web based purchase mechanism known in the art. For example, Pandesic offers integrated transactional mechanisms for Web based ebusiness.

Figure 3:
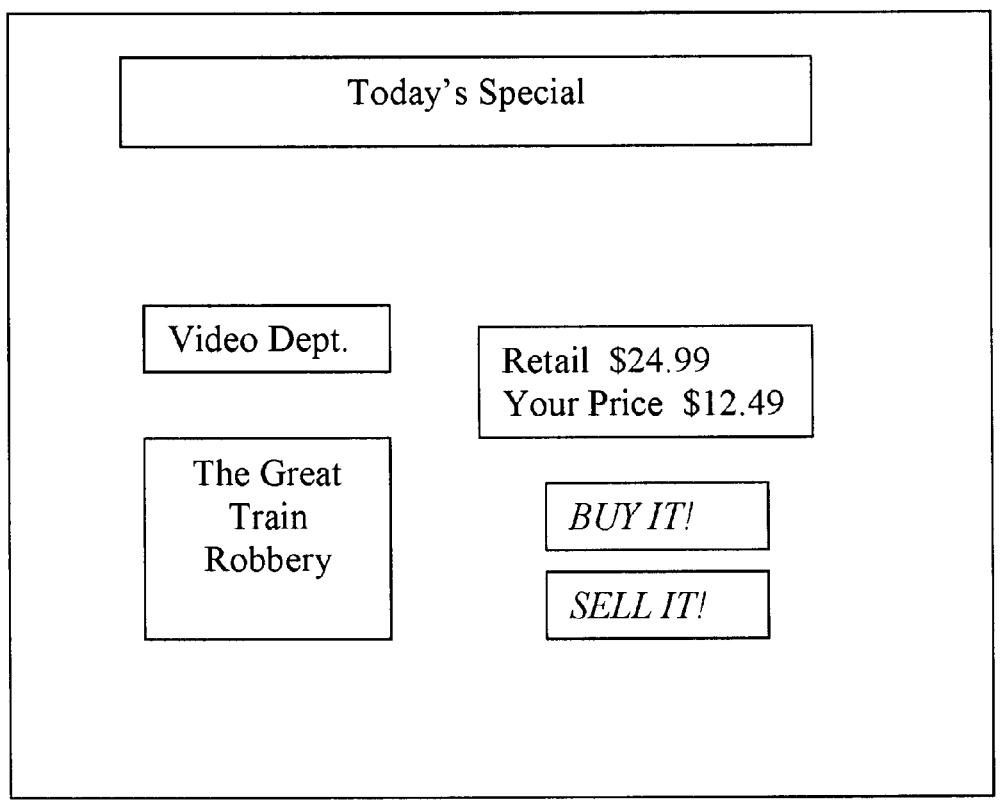
FIG. 3 also shows the embodiment of FIG. 1.

A vendor might also access this Webpage. The view is the same as seen by the buyer, that is, for example, the Webpage of FIG. 2. The vendor notes the price at which the product is being offered—in the example seen in FIG. 2, the product is offered at a price of $12.99. If the vendor desires to offer the product at a lower price, then it may click on the SELL IT button, and so change the price of the item. In the present case, after change by a vendor the price is seen at FIG. 3 to be $12.49. The vendor is now a supplier.

Thus a vendor with the ability to provide product at a lower cost is rewarded. It becomes an instant or nearly instant supplier. This embodiment of the present invention has created an instantaneous or nearly instantaneous method of channeling trade to this new supplier. This channel is dynamic: it has been created instantaneously or nearly instantaneously, and it can be eliminated instantaneously or nearly instantaneously. In this embodiment, for example, the prior channel, to a supplier offering the product at $12.99 was eliminated instantaneously or nearly instantaneously. This creation and manipulation occur simultaneously: in effect the first channel is simultaneously or nearly simultaneously, that is, substantially contemporaneously, replaced with the second channel. This channel is a dynamic sales channel because it is used in a sales situation.

In this or other embodiments, the supplier may choose to modify its own existing channel. In effect the first channel of that supplier is simultaneously replaced with a second channel to that supplier. More preferential pricing or other terms may be modified in the course of its possession of the channel. Additionally, in this embodiment, there is always a supplier, that is, an entity acting as supplier all the time.

This embodiment further permits other desirable parameters, such as availability, defined here as quantity available, and delivery date, that is, the date by which the product is available FOB, to be changed as well by the vendor—potential supplier.

In other embodiments, although the vendor may offer a price change or other modification, the actual acceptance by the Webpage owner or other entity might be delayed, such as for verification, credit checks or other reasons.

Figure 4:
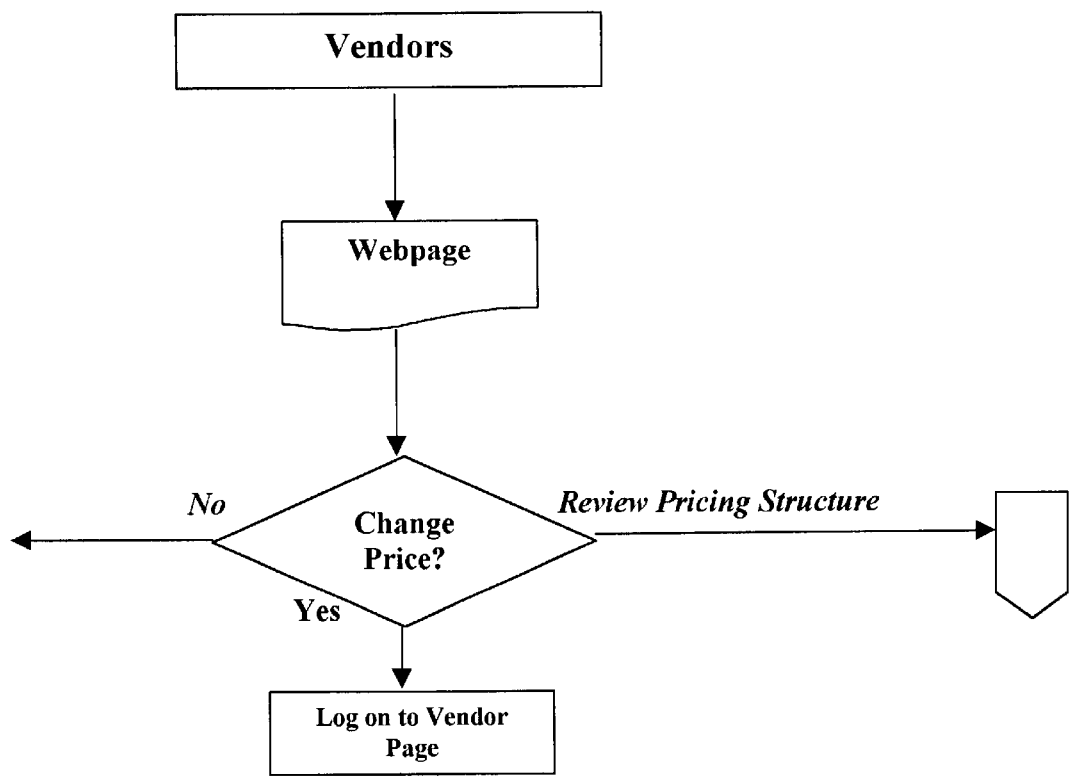
FIG. 4 also shows the embodiment of FIG. 1.

The method used in this embodiment for the vendor to change the price is seen at FIG. 4. The vendor, after viewing the Webpage, may or may not decide to change the price as shown on the Webpage of FIG. 2. If he or she does not, the process of the embodiment ends.

Figure 4A:
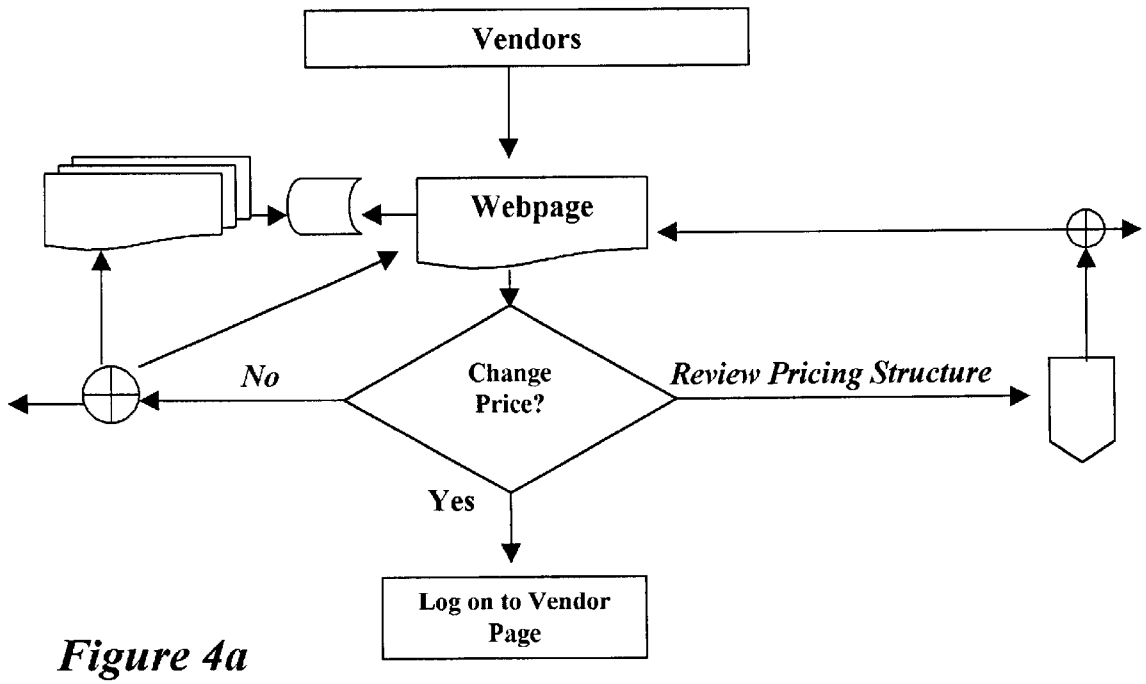
FIG. 4a also shows the embodiment of FIG. 1.

Other embodiments may have multiple alternatives as explained in further detail below. For example, in other embodiments, as shown in FIG. 4a, the vendor may choose to monitor the Webpage constantly, in order to determine whether it would be commercially advantageous to interpose a new price or other parameter, or to review other Webpages on the site, in order to determine if it wishes to open up new channels, or for other reasons, or to exit the site entirely. Of course, notification may occur in addition to monitoring, or instead of monitoring. This would occur through methods known in the art. So, for example, in an embodiment, email could be sent to vendors/suppliers notifying them that their commerce channel has been eliminated. Any or all of these operations could be done manually or automatically, in a manner or manners known in the art. The vendor may also, if desired, decide to review its pricing structure as described in further detail below. This may lead to a determination that it can or cannot sell at the current price.

Figure 5:
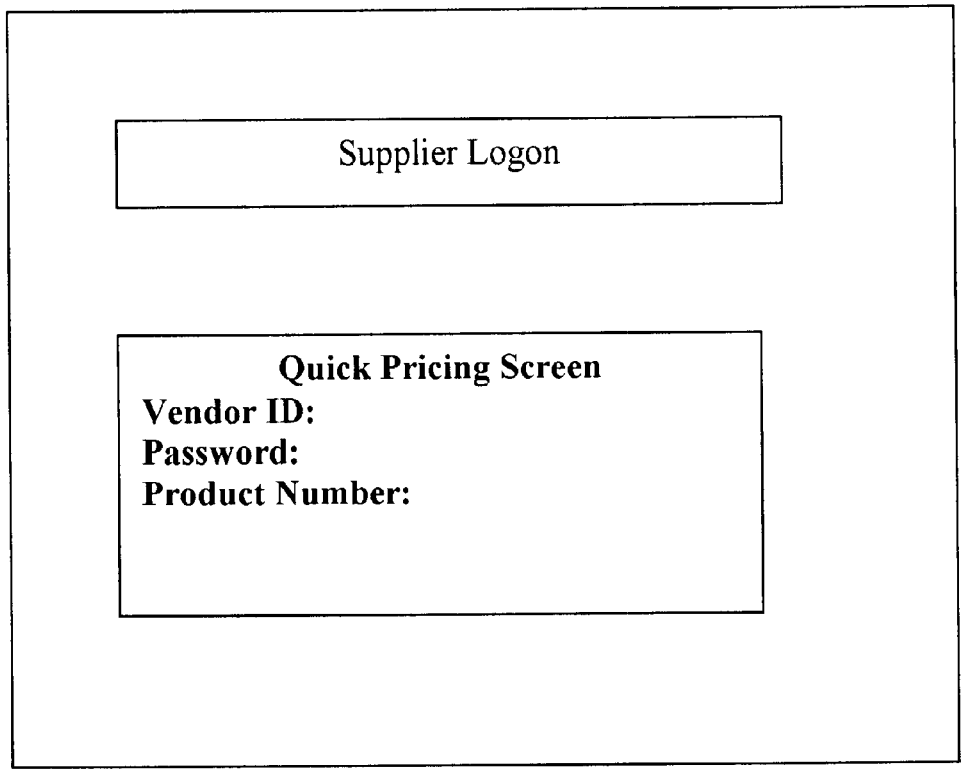
FIG. 5 also shows the embodiment of FIG. 1.

If the vendor decides to change the price then a further step arises in this embodiment. The vendor will click on the SELL IT button of FIG. 2, and be presented with a Webpage similar to FIG. 5. In other embodiments, there may be an interposed security screen, calling for security logon there. The Vendor is then presented with a Quick Pricing Screen. Here the Vendor ID: and Password: fields present the secure logon, in a manner known in the art. The field Product Number allows for the input of the Product Number whose price is desired to be changed. In this embodiment, numbers such as Stock Keeping Units or SKU's are used as product numbers, although it may be desired to use another system, of proprietary creation, or known in the art.

Figure 5A:
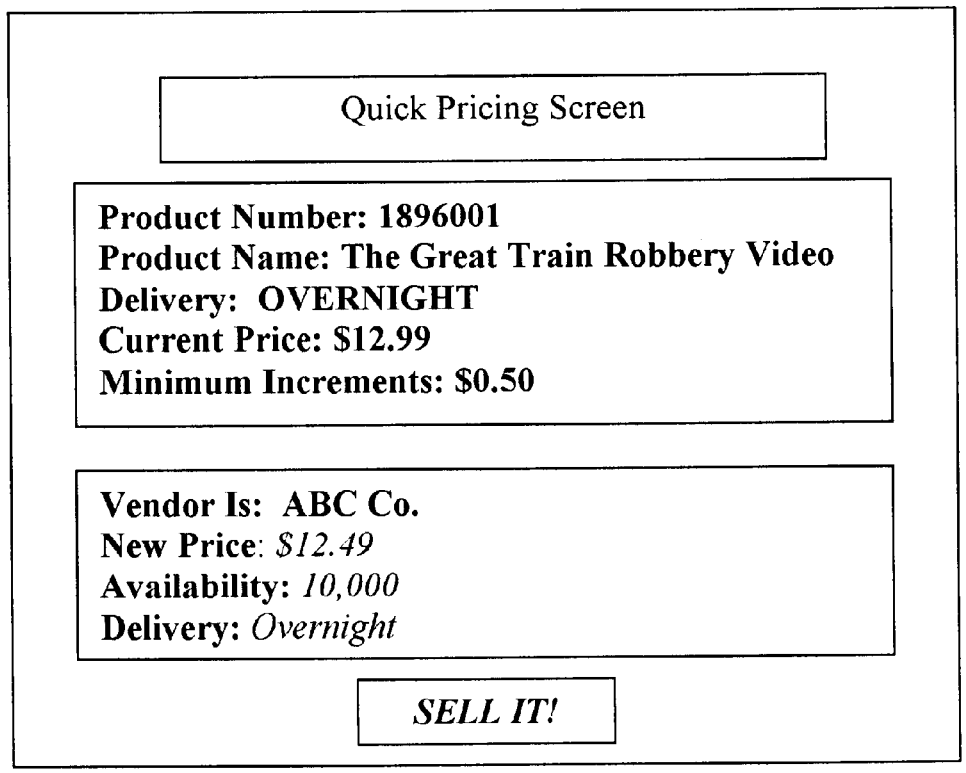
FIG. 5a also shows the embodiment of FIG. 1.

Once logged on, the vendor is presented with the Webpage of FIG. 5a. Shown in bold are the items not subject to change presently by this vendor, under this Quick Pricing Screen. Shown in italics are the items subject to change by this vendor, under this Quick Pricing Screen. Here the vendor has the option of changing price, although as can be seen in this embodiment, the price is only permissibly decreased in increments. The first increment is selected by default in this embodiment. The vendor also has the option of changing Availability, which in this embodiment means available units. Finally the vendor has the option of changing Delivery Date, which in this embodiment means the date FOB.

The vendor, if it has decreased the price by the minimum increment, can then click on the SELL IT button and instantaneously become the supplier. This is the creation of a dynamic sales channel: vendors instantaneously obtain trade. It is also the elimination of a dynamic sales channel for the prior supplier.

In this embodiment, as has just been described, the change in price was sufficient to create the channel. In this or other embodiments, a vendor's changes in other parameters may be enough to become the supplier, for example, more preferable quantities, faster delivery and the like. The decision whether these or other parameters make the vendor's offers acceptable is at the Webpage's owner's discretion in these embodiments, and may itself be dynamic. The Webpage owner, for example, may want a different quantity, pricing, or may want faster shipping, or may want other combinations that it determines are most desirable. It should be noted that the desirability of any particular parameters, and the offering of those parameters to various vendors, is not necessarily subject to any predetermination, but itself may be dynamically changed as the Webpage owner determines its wants and needs.

Every aspect of the commercial transaction may be available for vendors in various embodiments. For example, the pricing and availability may be controlled by one vendor, and the shipping by another. There may also be cascading or nesting embodiments. In other words, in other embodiments, a vendor or vendors may have an internal embodiment or embodiments of the present invention so that it or they too may benefit from dynamic commerce channels.

Returning now to the embodiment of FIG. 5a, the vendor clicks on the SELL IT! Button, and becomes a supplier. In this embodiment, the changes are then reflected on the Webpage, as seen at FIG. 3—that is, the price is changed to the new lower price. All of the Webpage owner's orders for the product are then channeled to this supplier, in effect, a dynamic channel has been instantaneously opened up to it.

In other embodiments, the buyer may or may not buy the product, and may also choose to be notified if the price or other parameter changes. This could mean, for example, that a buyer would be notified if the price of a video changes to a desired level. The buyer could then initiate a purchase through various methods, such as manually or automatically responding to the email in order to buy the product. In yet other embodiments, the buyer could choose to leave an order on hold, that is, once the price or other parameters met the buyer's requirements, the system would execute an order on behalf of the buyer.

It should be noted in that in this embodiment the Webpage owner obtains a commission on the sale from the supplier. A contract is formed with the channel between the Webpage owner and supplier. A contract also exists between a buyer and the Webpage owner.

Of course in other embodiments, a contract or contracts do not necessarily have to be formed if the nature of the commerce in the channels does not require contractual relationships. Moreover, a commission structure does not have to be used. In other embodiments, remuneration to the Webpage owner may not be necessary. Other methods of remuneration known in the art may also be used. Additionally, in other embodiments, the vendors/suppliers may compete at other commerce levels. For example, in some embodiments, the vendors compete on wholesale price. The price offered to buyers may be posted, but the vendor/supplier may actually change the price to the intermediary, who then offers it at the posted price, which may or may not change as desired, automatically or manually. Other pricing methods known in the art may be used as well.

Other embodiments may not even have an intermediary such as a Webpage owner. The dynamic channels may be created, eliminated or modified directly, between a buyer and seller, or other commercial entities. In some embodiments, this may lead to a contract being formed directly between the entities, although in other embodiments a contractual relationship may not be necessary.

Figure 6:
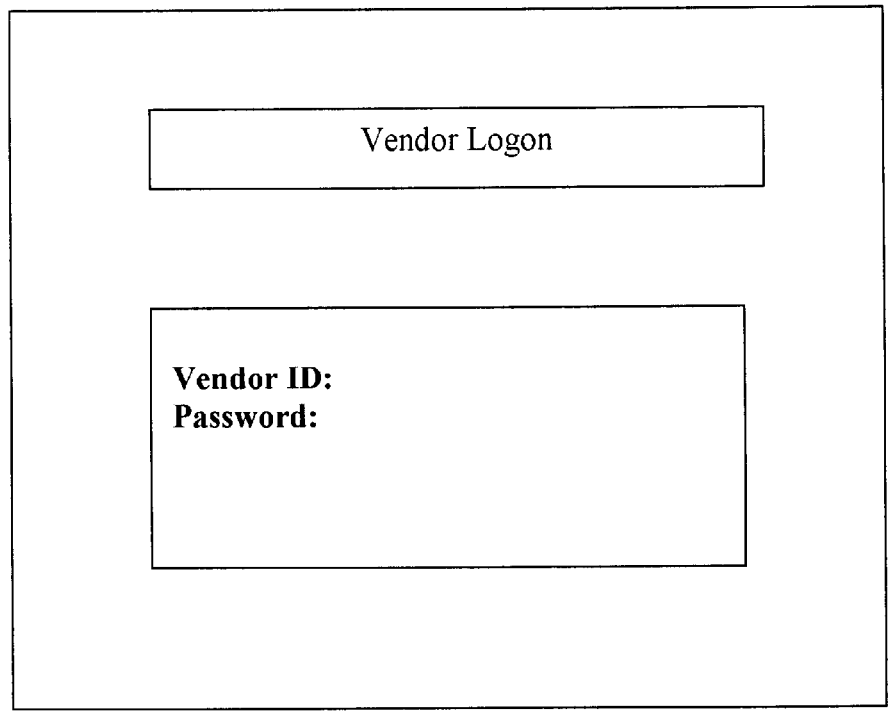
FIG. 6 also shows the embodiment of FIG. 1.

In the embodiment described above with regard to FIG. 2, the change in pricing has led to other changes. FIG. 6 shows use of a vendor logon screen, which in this embodiment, is entered by way of an alternative Web address or URL, rather than a buyer-vendor screen.

Figure 7:
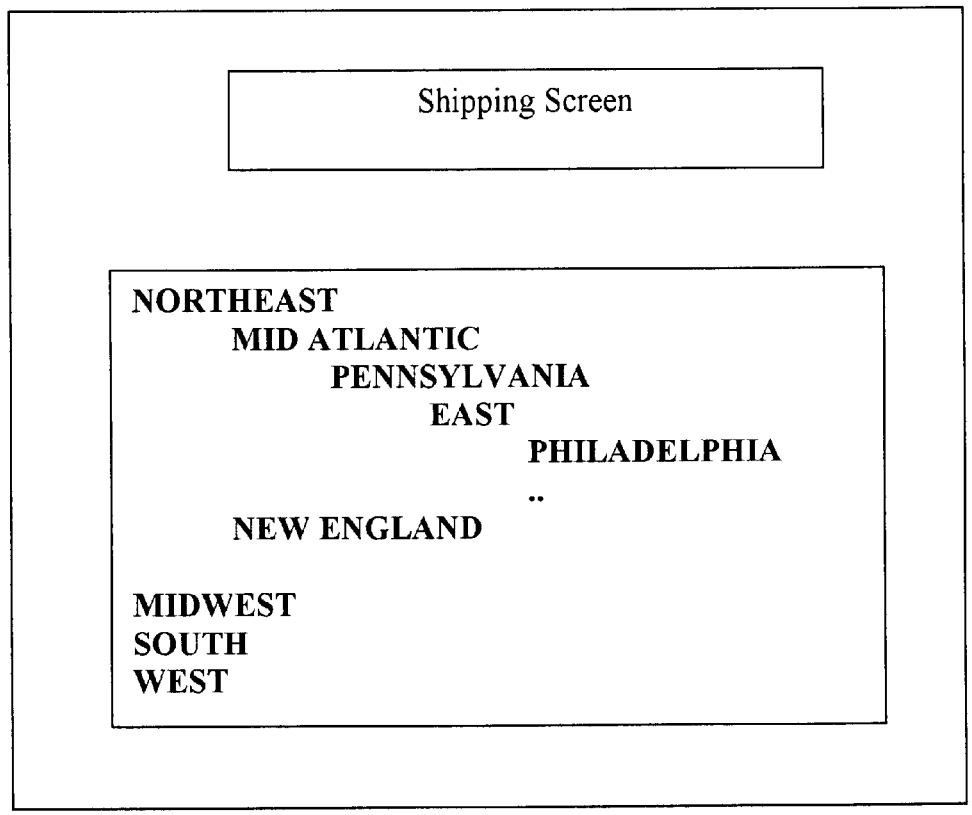
FIG. 7 also shows the embodiment of FIG. 1.

Once this screen is successfully navigated, the Shipping Screen of FIG. 7 appears, brought up via recognition of the vendor id number. In other words, in this embodiment the vendor id number has been preassigned, and identifies the vendor as a seller of specific goods or services or the like. In this particular embodiment, the vendor id, when input, is recognized as that of a shipper.

Thus the Webpage illustrated in FIG. 7 is accessed, and shows the various sites from which products are being shipped. Here it is broken down by geographic areas. The shipper clicks on the area of interest, which through use of cascading screens or other methods known in the art, "drills down" into the areas of interest.

At FIG. 8 is shown the shipment location of a product from the supplier dock, or FOB as that term is being used herein. FIG. 8a shows the changed location, after, for example, the price change described above. The default shipper's prices are shown. The shipping vendor can review these prices and perhaps change them in order to capture the shipping orders—in order to have a dynamic commerce channel opened to it. (In this embodiment, the ordering of the shipment is done automatically from the default shipper, unless changed as described herein.)

In the embodiment of FIG. 5a above, the changes occur via hypertext, that is, merely by clicking on the options the vendor will be able to change them. Other methods may be used, including drop boxes or other methods known in the art. It should be noted that in this embodiment, the use is manual. Other embodiments may have automatic information transfer, that is, processes such as notification, signing on, checking prices, and modifying prices may be accomplished through interactions between the computers via methods known in the art. It should also be noted that the vendor may, if desired, and in preferred embodiments, automatically change his pricing structure. For example, the vendor may automatically obtain the present sale price of the product, and determine if it could effectively compete and lower that price if necessary. (It may also serve as a source of competitive intelligence, if in fact the suppliers are known to each other.)

A single vendor may, in fact, be able to change a number of parameters at once. For example, in other embodiments, a vendor may be known to sell ten items, and at the single click of a mouse, or other method known in the art, be able to change the price of some or all ten at once. For example, in other embodiments, a vendor may have ten items, in various categories, such as three cameras, four tripods, and three recorders. It may then be able to change parameters—price and others—for an entire category of products at once. For example, in yet other embodiments, a vendor may simultaneously be able to change prices or other parameters by a single factor—such as decreasing all prices by two percent.

In the majority of the embodiments, the opening of new channels to suppliers will be invisible to the buyer, and thus the supplier's identity. Occasionally, it may be desired, however, to disclose the supplier's identity.

Any interaction with the supplier could give the supplier various marketing, inventory, sales and other pertinent data. This might include the best selling products, the best times of sale, and other information available to the suppliers. Additionally, the data created by the interaction could be captured by the Webpage owner, and in the preferred embodiments it would do so, either instead of, in addition to, the capturing of data by the suppliers. Additionally, other embodiments may have a report back function, to automatically report back on inventory as it is depleted, or other parameters as they are affected by trade, either or both to the Webpage owner and to the supplier or suppliers. For example, in some embodiments, instantaneous reordering might be desirable.

It must be emphasized the embodiments are not confined to the Internet, or even computer networking. For example, one possible embodiment is the use of the telephone system to place orders, while at the same time using a computer network for suppliers. Alternatively, and in other embodiments, telephone or other media could be used, so long as they permit instantaneous or nearly instantaneous updating of commercial information. Moreover, the buyer's use of media does not have to parallel the vendor's use, insofar as the buyer does not even have to know of use of the present invention.

For example, in a embodiment, a buyer may use a telephone, letter or other method known in the art to contact the seller. The seller may simultaneously, independently of those transactions, be using a system to permit vendors to instantaneously or nearly instantaneously open up channels to it, the seller. This would mean the seller may or may not then pass along whatever change in prices—higher as well as lower—it may receive from its supplier/vendors to the buyers.

Figure 9:
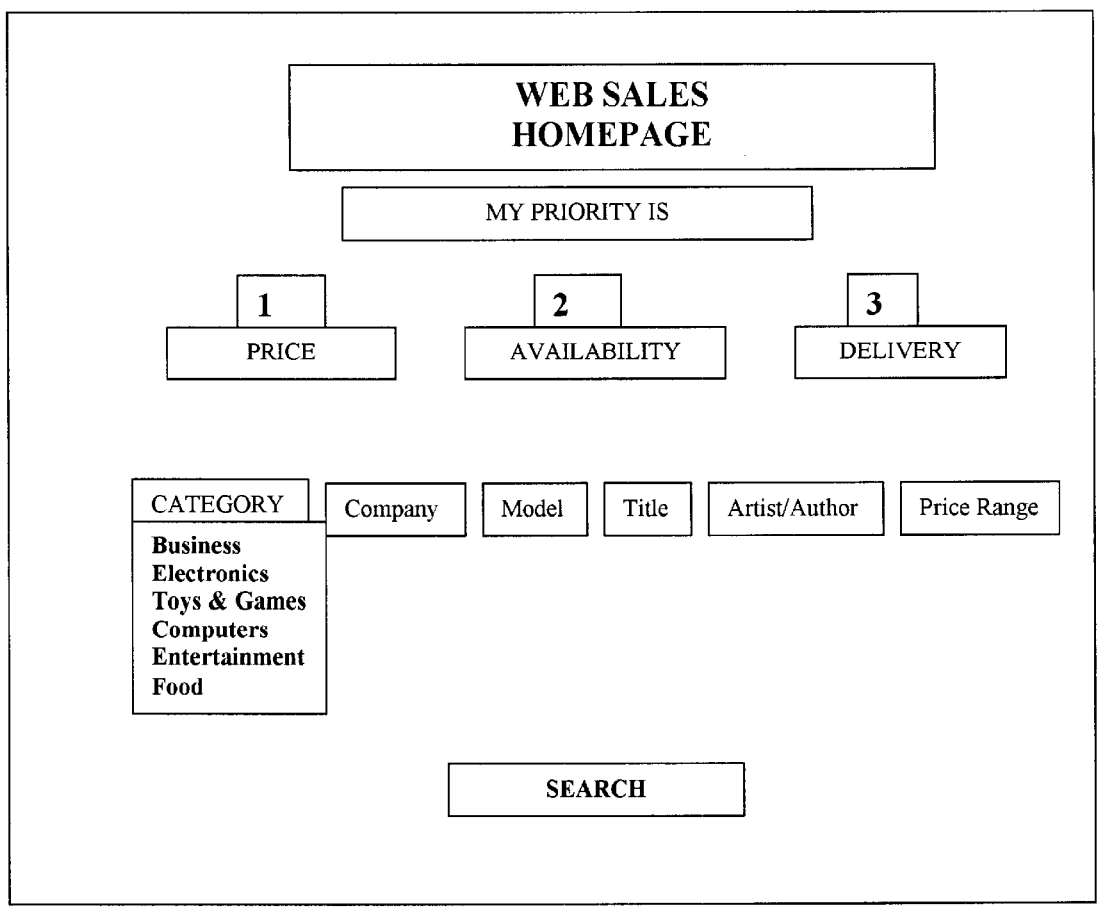
FIG. 9 shows another embodiment of the present invention.

At FIG. 9 is shown another preferred embodiment for Webbased commerce. A home page is shown in this embodiment. The buyer can name a number of choices.

The buyer can click on price, availability, or delivery as a priority. The buyer will then establish his or her product. Such a search can be by a number of variables. One variable used, for example, in this embodiment is category. The drop down box shows various product categories. Other searches would be by other variables, for example, company model, title, artist/author or price range or any other desired variables or combinations of variables. This embodiment provides a home page environment or portal environment.

Figure 10:
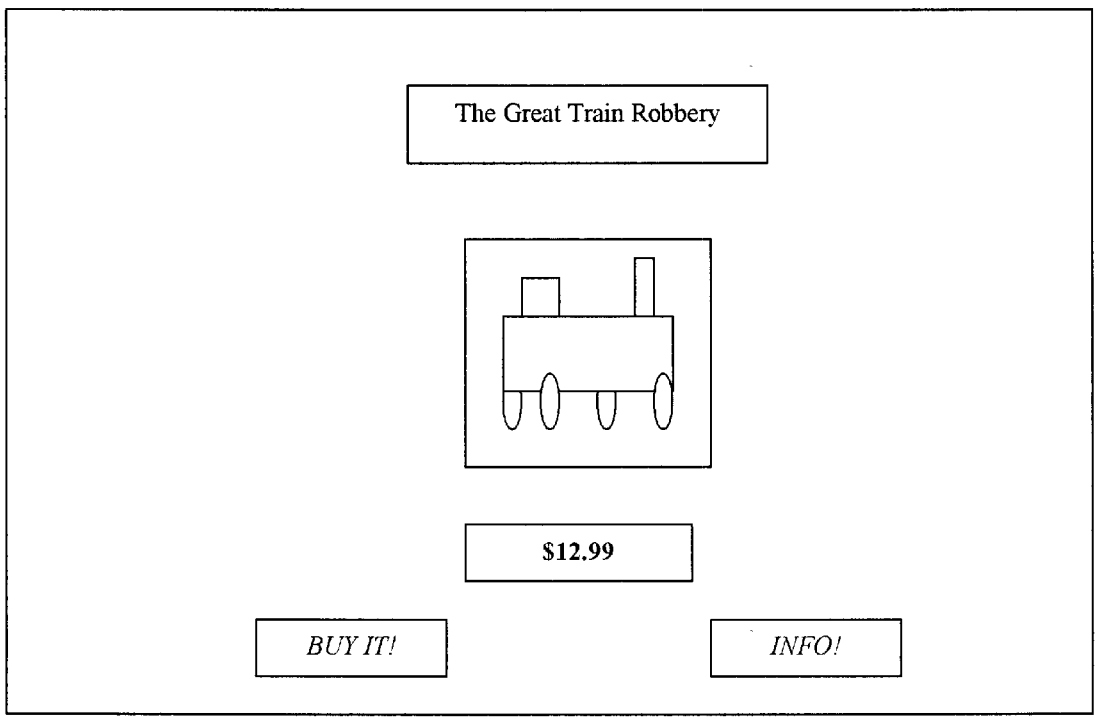
FIG. 10 also shows the embodiment of FIG. 9.
Figure 11:
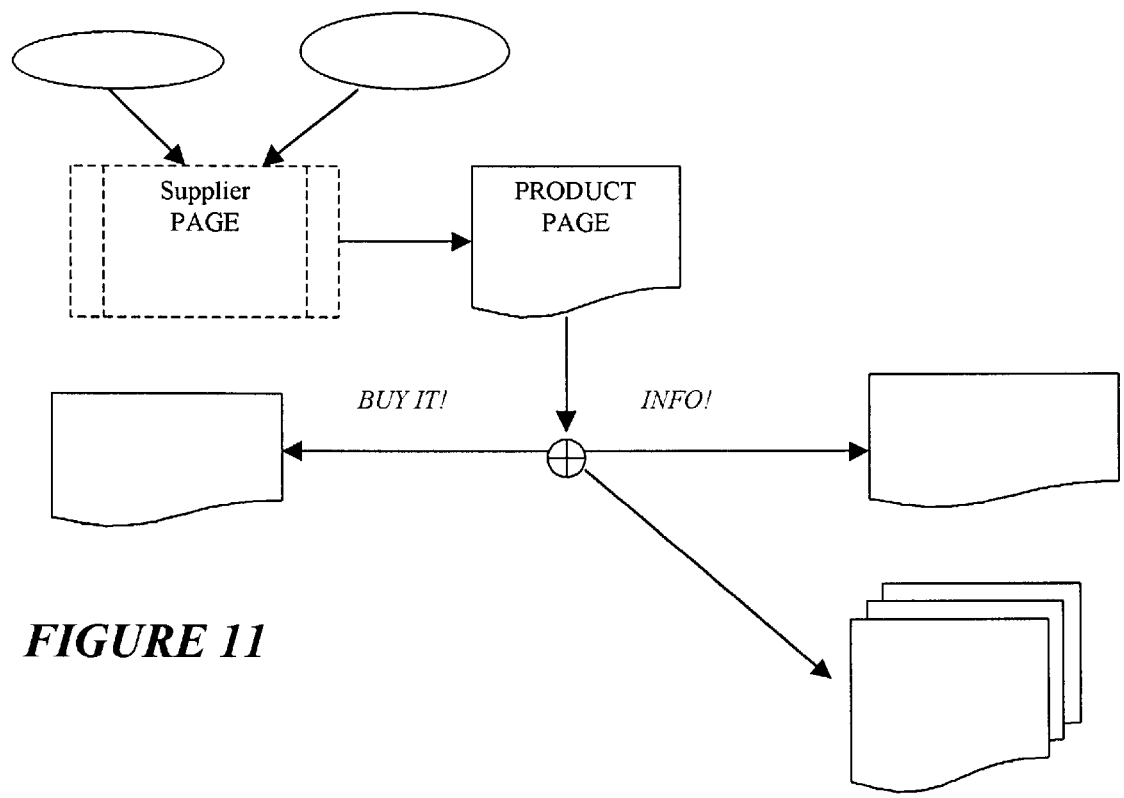
FIG. 11 also shows the embodiment of FIG. 9.

FIG. 10 shows, for example, the results of a search in the entertainment category, via a methods known in the art. The Webpage displays the video The Great Train Robbery. The price is $12.99, and the buyer could choose to buy it, via methods known in the art. The buyer can also choose to seek information on the product, in this embodiment. As seen at FIG. 11 this would lead to another Webpage or pages. These page or pages would be stored internally, and/or link manually or automatically to various search engines or other directories. This may function as a "one stop" operation, with the ability to find research on the product, product news, updated information, links to manufacturers' sites, government sites, all without leaving the portal site. In some embodiments, even if the portal site is left to follow other links, the user can return easily through methods known in the art, or even through creating the portal as the home page.

FIG. 11 shows also, in phantom, a supplier page. In this embodiment, this page would be invisible to the buyer, yet the vendors would be able to access the current price of the product and lower it if desired.

Of course, it is possible to incorporate embodiments with other desirable features. In one preferred embodiment a Web site embodiment is personalized. Its appearance may change according to the net use at any specific time. So for example nearly a holiday season such as Christmas, the page may change to reflect dynamic changes in interests. These may be overridden or modified by the personal preference of the Webpage user.

In other embodiments, the appearance may also be changed according to the personal preferences of the user, by offering, for example, a list of options the user could use to construct his or her home page. The default site, in a preferred embodiment, might be a blank slate site, when first visited. The user might then be requested if he or she would desire to change the default site to a personalized site through use of various options. This could, of course, give the user the option to change to a personalized page or blank slate page when and as desired.

These options could include areas of personal interest, business interest, navigational tools and the like. For example, in some embodiments, the user might desire to construct a home page that would include chat areas of interest, news areas of interest, links to other sites of interest, a friends and family or buddy list, available programming such as audio or video streams or other "mix and match" approaches to constructing a personalized appearance for the site.

In most embodiments the vendors are pre-approved. Additionally, in most embodiments the use will be via the Internet or Webpages, or other connected networks, such as an intranet, so that the methods and systems comprise a dynamic ecommerce channel or channels.

Figure 12:
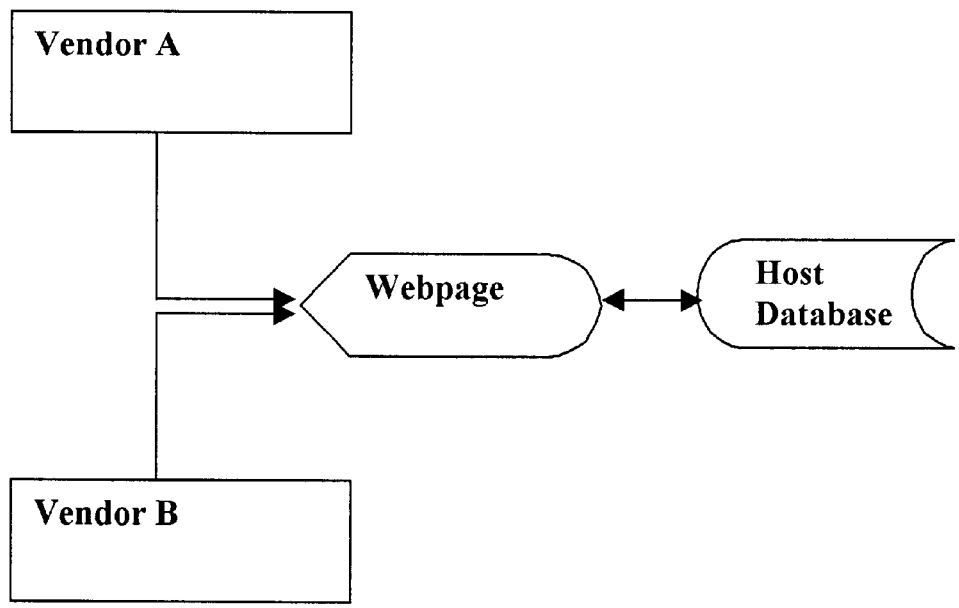
FIG. 12 shows another embodiment of the present invention.
Figure 13:
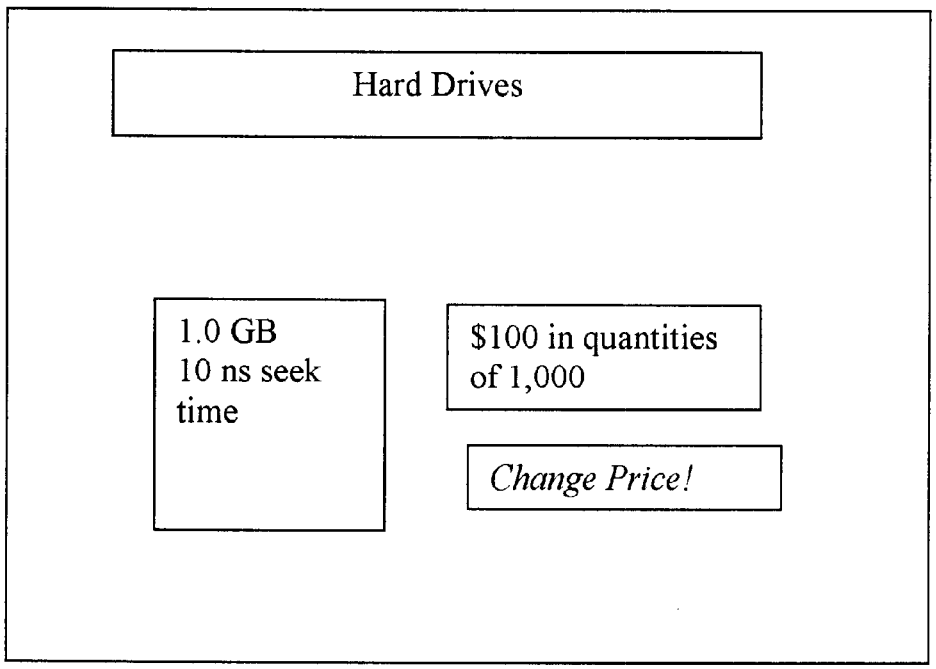
FIG. 13 also shows the embodiment of FIG. 12.

As noted above, embodiments of the present invention include direct buyer-vendor interactions as well. For example, the embodiment of FIG. 12 shows a diagram of a Website of a manufacturer. At FIG. 13, the Webpage of the embodiment shows 1.0 GB hard drives are presently being offered to the manufacturer at $100 each in quantities of one thousand.

Figure 14:
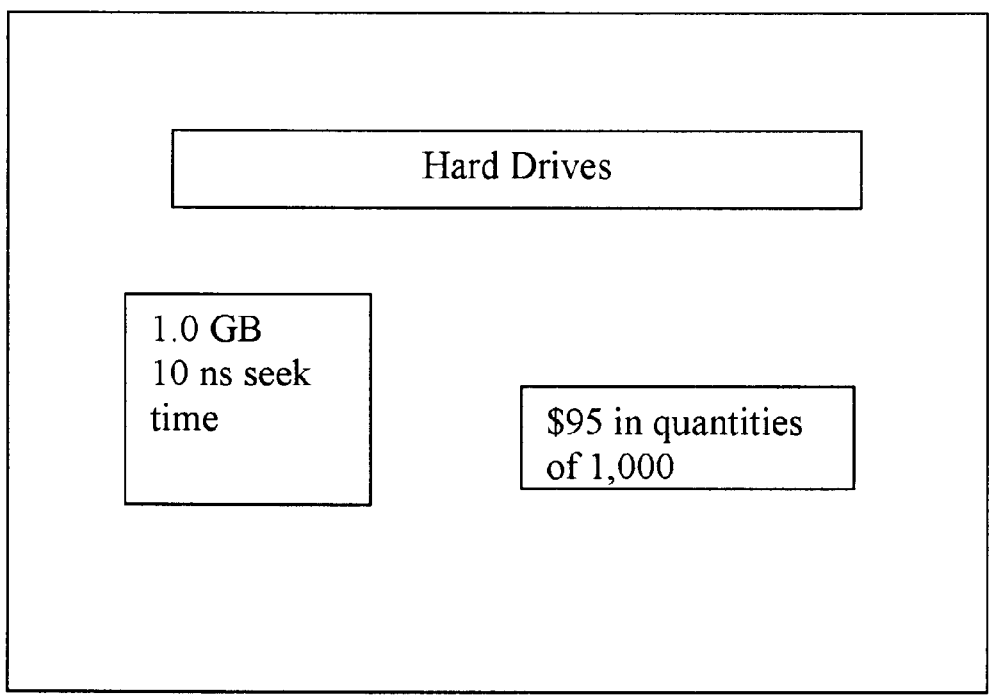
FIG. 14 also shows the embodiment of FIG. 12.

At FIG. 14 is shown the effect on the price after vendor B has accessed the Webpage and changed the pricing. Supplier B is now offering the drives for $95.00. A dynamic channel has been created, and a dynamic channel; has been eliminated. Other embodiments, the manufacturer may desire to post or offer other terms or parameters it is offered, in order to create modify, or eliminate dynamic commerce channels.

Clearly, in especially dynamic industries, that is, industries where prices and other parameters fluctuate constantly, this system offers benefits to the entities in those industries by its methods and systems permitting instantaneous or nearly instantaneous dynamic commercial channels to be created, eliminated and modified. Just as clearly, this is true as well in times of economic fluctuation, such as inflation, recession and the like.

The above description and the views and material depicted by the figures are for purposes of illustration only and are not intended to be, and should not be construed as, limitations on the invention.

Moreover, certain modifications or alternatives may suggest themselves to those skilled in the art upon reading of this specification, all of which are intended to be within the spirit and scope of the present invention as defined in the attached claims.

I claim:

1. A method of commerce comprising:
   creating a first trade channel for a predetermined good or service between a first entity and second entity, using, at least in part, an interconnected network of computers; and
   eliminating, simultaneously or nearly simultaneously, a second trade channel for said predetermined good or service between said first entity and a third entity.

2. A method as in claim 1, wherein the step of using, at least in part, an interconnected network of computers further comprises using the interconnected network of computers known as the Internet.

3. A method as in claim 1, wherein the step of eliminating said second trade channel further comprises using, at least in part, an interconnected network of computers.

4. A method as in claim 3, wherein the step of using, at least in part, an interconnected network of computers further comprises using the interconnected network of computers known as the Internet.

5. A method of commerce comprising:
   maintaining a first trade channel for a good or service between a first entity and second entity;
   eliminating said first trade channel;
   creating a second trade channel for said good or service instantaneously or nearly instantaneously with the elimination of said first trade channel;
   while using, at least in part, an interconnected network of computers.

6. A method as in claim 5, wherein the step of using, at least in part, an interconnected network of computers further comprises using the interconnected network of computers known as the Internet.

7. A method for facilitating the purchase and sale of goods and services comprising:
   providing a first offer, by a first entity, for a good or service using the interconnected network of computers known as the Internet;
   providing a means for a second entity to accept said first offer for said good or service;
   providing a second offer, by a third entity, for said good or service to said first entity; and,
   accepting, by said first entity, said second offer of said third entity.

8. The method of claim 7 wherein the step of providing a first offer further comprises the steps of providing a third offer by a fourth entity for said good or service at said first price to said first entity, and accepting the offer from said fourth entity to said first entity.

9. The method of claim 8 wherein a first contract is created by accepting the third offer from said fourth entity to said first entity.

10. The method of claim 8 wherein a second contract is created by accepting said second offer from said third entity to said first entity.

11. The method of claim 10 wherein a first contract is created by accepting the third offer from said fourth entity to said first entity and said first contract is terminated simultaneously or nearly simultaneously with the acceptance of said second contract.

12. The method of claim 8 wherein a third contract is created between said first entity and said second entity.

13. The method of claim 7 wherein said first entity comprises an intermediary.

14. The method of claim 7 wherein said second entity is a buyer.

15. The method of claim 7 wherein said third and said fourth entities are vendors.

16. A method of commerce comprising:

creating a trade channel for a predetermined good or service between a first entity and second entity using a first instantaneous or nearly instantaneous communication media while simultaneously or nearly simultaneously eliminating a second trade channel for said predetermined good or service between said first entity and a third entity using a second instantaneous or nearly instantaneous communication media, wherein the said first and said second instantaneous or nearly instantaneous communications media are the same media; and wherein the communications media are networked or interconnected computers or other data processing devices.

17. The method of claim 16 wherein the communications media are the interconnected network of computers known as the Internet.

18. A method for facilitating the purchase and sale of goods and services comprising:

offering, through an Internet presence, a good or service for sale at a first price by a first entity;

providing, through an Internet presence, means for acceptance of said offers by a second entity;

providing, through an Internet presence, means for changing said first price to a second price by a third entity of said goods or services, thereby offering said good or service for sale by said first entity at a second price; and, providing, through an Internet presence, means for acceptance of said offers, at said second price, by said second entity.

* * * * *